United States Patent Office 3,390,678
Patented July 2, 1968

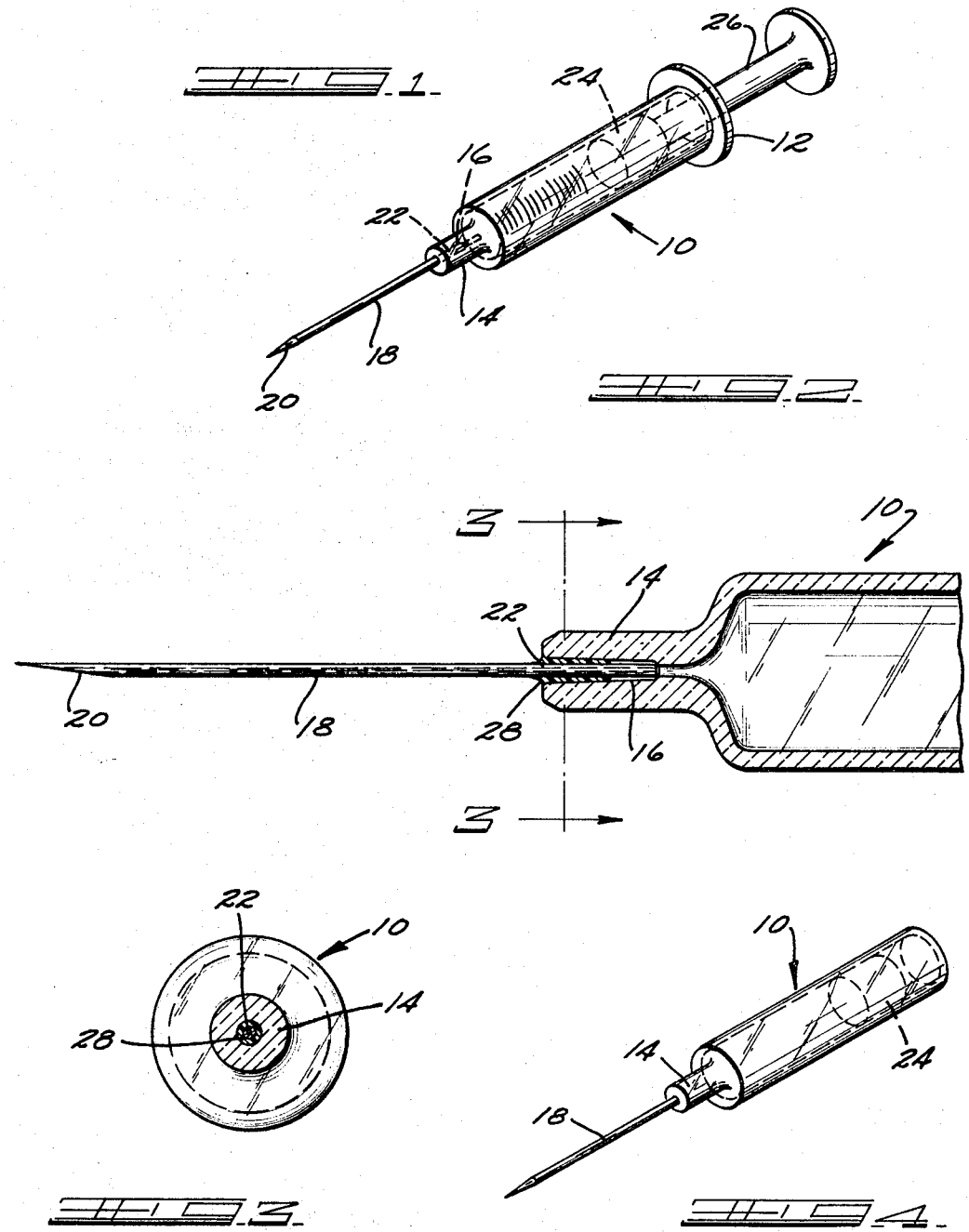

3,390,678
HYPODERMIC SYRINGE ASSEMBLY
Ronald W. Bradley and Albert D. Lewis, Toledo, Ohio, assignors to Owens-Illinois, Inc., a corporation of Ohio
Filed Aug. 13, 1963, Ser. No. 301,727
12 Claims. (Cl. 128—221)

The present invention relates to a container which can be utilized in a disposable hypodermic syringe assembly which container is capable of withstanding high-temperature sterilization techniques encountered in the pharmaceutical industries, and more particularly, the present invention relates to a syringe cartridge obtained by bonding the metal cannula to the glass barrel or hub of the assembly. The container or cartridge can be used to retain a sterilized product or be sterilized and used at the point of use as a conventional syringe.

Various types of hypodermic syringes have been employed in the past for the administration of therapeutic substances by subcutaneous, intra-muscular or intravenous injections. Most of these syringes have a needle with a bevelled point at one end of the cannula and the other end of the cannula being attached to a hub or luer which is in turn attached to the glass cartridge or barrel which contains a therapeutic agent. The hypodermic assembly is packaged to contain a single dose of the therapeutic substance and, after the injection, the entire hypodermic needle is disposed of. Disposable hypodermic syringes have found wide acceptance because of their convenience and reduction in the threat of transmitting disease by constant repetitive use of the needle in those instances where thorough sterilization may not be achieved between uses.

In most of the commonly employed structures, the cannula is made of stainless steel and the hub or luer is made of metal or plastic. Various attempts have been made in the past to achieve a durable bond between the glass barrel and the metal cannula, however, because of dissimilarity between the materials and their thermal expansion characteristics, the results have not always been satisfactory. For example, methods of bonding a metal cannula to a glass barrel which involve melting the glass around the cannula and cooling to form the seal have been employed. However, this method generally results in the metal needle being adversely affected during bonding glass to metal directly. Other materials such as beeswax or paraffin have been employed, however, these cannot withstand high temperatures and have found only limited applicability because of low strength characteristics.

In addition to the shortcomings mentioned above, several of the previously known methods have been characterized by severe limitations being placed on the methods of sterilization and use. Plastic materials have been employed to produce a bond between the cannula and the bore of the glass barrel. However, the plastic materials have limited applicability because in general, the bonds created thereby cannot withstand the high sterilization temperatures often required in modern pharmaceutical operations. When heated to high temperature, the sealant frequently experiences a loss in strength or failure of the glass barrel making the assembly unacceptable for further use.

One of the more recent attempts to find a suitable adhesive material for hypodermic needles has involved epoxy resin mixed with amine and amide hardeners. Although these adhesive substances produce good adhesion and good flexibility, they are not able to satisfactorily withstand the heat sterilization cycles which are normally encountered in modern pharmaceutical techniques. More specifically, because of differences in thermal coefficient of expansion of the metal and glass, certain changes in dimension take place as the temperature is increased to high temperatures which results in great stresses being introduced into the epoxy adhesive and causing failure of the bond or fracture of the glass.

The stainless steel cannulas normally used for hypodermic needles have a considerably higher thermal expansion than the glasses which are used for barrels. Specifications for such needles are set forth in Federal Specification GG-N-196. As the seal is heated in the course of sterilization, the steel cannula expands at a greater rate than the surrounding glass, causing circumferential tension in the glass and longitudinal radial fractures. This produces cracking, separation of the glass and metal and a general deterioration of the hypodermic assembly with the result that they are incapable of further use.

It is therefore one of the objects of this invention to overcome the disadvantages and shortcomings of the prior known disposable hypodermic syringes referred to above.

It is another object of this invention to provide a method for forming a hypodermic syringe assembly wherein the metal cannula is securely bonded to the glass syringe component and which is able to withstand high temperature sterilization operations.

It is a further object of this invention to provide a hypodermic syringe assembly capable of withstanding high temperature sterilization operations with the bond between the two materials being permanently maintained and effective even though these materials have widely different coefficients of thermal expansion.

It is still a further object of this invention to provide a hypodermic syringe assembly having a substantially transparent and non-toxic seal between the metal and glass surfaces, capable of withstanding high temperature sterilization operations without deleterious weakening of the seal.

In attaining the above objects of the present invention, one feature resides in the use of an epoxy-polyamide resin composition which contains incorporated therein an agent which modifies the thermal expansion characteristics of the adhesive material for bonding the metal cannula directly to the glass barrel of a syringe assembly.

Another feature of the present invention resides in the particular quantities of a finely divided modifying agent which is incorporated into the adhesive material employed in the hypodermic needle and syringe assembly of the present invention.

Other objects and features of this invention will become apparent to those skilled in the art from the following detailed description thereof taken in conjunction with the accompanying drawing, wherein:

FIGURE 1 is a perspective view of an embodiment of the hypodermic syringe assembly of the present invention;

FIGURE 2 is an enlarged sectional plan view of a portion of the hypodermic syringe assembly of the present invention;

FIGURE 3 is a cross-sectional view taken along lines 3—3 of FIGURE 2; and

FIGURE 4 is a perspective view of another embodiment of the hypodermic syringe assembly of the present invention.

It has now been discovered that the properties of the adhesive material employed in bonding hypodermic needles to barrels and hubs can be unexpectedly changed by the incorporation of a particulate material. The particular adhesive material which is employed for bonding a hollow metal cannula to a barrel or hub of the hydodermic springe is a mixture of an epoxy resin and a polyamide curing or hardening agent. The incorporation of small amounts of finely-divided silica in the adhesive composition provides a preferred transparent seal between the cannula and barrel which is flexible, strongly adherent and can withstand the high sterilization temperatures without showing any signs of failure.

The hypodermic syringe assembly that is employed for purposes of the present invention can be any one of several conventional types. For example, the one that has been found to be most commonly employed and which is illustrated in FIG. 1 comprises a syringe 10 which is usually cylindrical, open at one end 12, and provided with a constricted end portion 14 at the opposite end, which end portion defines an opening or bore 16 communicating with the interior of the syringe 10. The hollow metal cannula 18, which is normally cylindrical, is provided with a sharp bevelled point 20 at one end, and the opposite end 22 is inserted into the bore 16 of barrel end portion 14. The syringe 10, when filled with a therapeutic material (not shown), is sealed with a member 24 slidable within the syringe and acting as a piston to force the therapeutic agent to pass through the cannula 18. Plunger 26 is suitable for forcing piston 24 downwardly into the syringe 10. The cannula 18 is sealed into bore 16 by the adhesive composition 28 of the present invention.

The hypodermic syringe of the invention is assembled and normally sterilized prior to being filled with the pharmaceutical agent. Thus, the syringe manufacturer may proceed to assemble the springe and cannula using the composition of the invention and may, after subjecting the assembly to a sterilization temperature for the necessary length of time, ship the sterilized assemblies to the pharmaceutical manufacturer. However, the usual practice involves sterilizing the assembly immediately prior or subsequent to filling. As is customary the cannula is covered prior to sterilization by a suitable needle point cover such as that disclosed in U.S. Patent 2,831,483, which cover is removed just prior to use of the hypodermic syringe.

The adhesive composition which is employed for this invention contains an epoxy resin which can be any one of low molecular weight epichlorohydrin-bisphenol A-types. The poly-epoxides suitable for purposes of this invention contain more than one reactive epoxy group of the structure

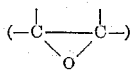

in their molecule. They are known as glycidyl polyhydric phenols and are obtained by reacting a polyhydric phenol with an excess of an epihalohydrin.

These resins are light colored and are pourable liquids at room temperature and are widely used for adhesive purposes. A typical example of such epoxy resin is Epon Resin 828 (Shell Chemical Co.) which has a viscosity at 25° C. to 100 to 160 poises and an epoxide equivalent in the range of 185 to 192. Typical properties of this resin are:

Weight per gallon—pounds at 20° C. ____ 9.7
Density g./ml. at 20° C. _____ 1.168
Refractive Index at 25° C. _____ 1.570–1.575
Average molecular weight (approx.) _____ 3.80

The structural formula for this material can be represented as

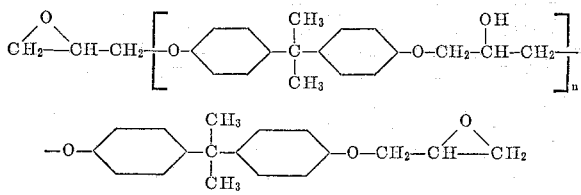

The polyamide curing agent which is employed for purposes of this invention is believed to form an alloy with the epoxy resin and serves to improve the general properties of the adhesives for the intended sealing. This is due to the cross-linked nature of the resulting resin and which provides the desired properties of flexibility and structural strength of the adhesive material. Typical examples of the polyamide resins which can be employed for purposes of this invention are condensation polymers of dimerized and trimerized vegetable oil, unsaturated fatty acid, with arylene or alkylene polyamines. The condensation product of a linoleic acid dimer and ethylene diamine is an example of a polyamide hardener. The commercially available polyamides are amber-colored thermo-plastic resins with molecular weights up to 10,000 and melting points ranging up to about 190° C. The polyamide polymers which are used for compounding with the epoxy resins to produce the adhesives of the present invention are characterized by a relative low viscosity and are capable of combining with epoxy resins to give adhesive compositions of a high tensile strength. The amine value of the polyamide resin is in the range of approximately 375, the specific gravity is approximately 0.97, and the material weighs approximately 8.1 pounds per gallon at 25° C. The value given above for amine value is the milligrams of KOH equivalent to base content of 1 gram of resin as determined by HCl titration..

As pointed out above, although the epoxy mixed with the polyamide resin under normal conditions yields a suitable adhesive material, it has been found that this adhesive composition is unsatisfactory for those single-use disposable hypodermic syringes which are subjected to thermal sterilization operations normally encountered in pharmaceutical processing. Problems of resin separation from the needle and breakage of the glass container caused by differences in coefficients of thermal expansion are encountered. In addition, separation of the resin from the metal occurs frequently in polyepoxide-polyamide adhesive compositions which indicated unbonded areas.

In the hypodermic needle assemblies which are bonded with conventional adhesives, the sterilization technique followed employs ethylene oxide gas at about 40 to 50° C. for aproximately 7½ hours. This procedure is by its nature expensive and cumbersome. By the process of the present invention it is possible to quickly sterilize at substantially higher temperature using ordinary steam at 121° C. for one hour in an autoclave.

The silica which is preferably added to the adhesive composition is a submicroscopic particulate silica prepared in a hot gaseous environment by vapor phase hydrolysis of a silicon compound. The average particle size range of this material is preferably within the range of approximately 0.015–0.020 microns. The bulk density ranges in the amount of 2.2 to 4 pounds per cubic foot.

In preparing the adhesive material of the present invention the epoxy resin is present in the amount of about 40 to 90 parts by weight and the polyamide is present in the amount of about 60 to 10 parts by weight. Preferably the ratio is about 50:50. An organo-silane coupling agent is required ranging in amount from about 1 to 5 parts by weight based upon 100 parts of epoxy resin to maintain good adhesion between the epoxy and the glass. This is necessary where a contained pharmaceutical may contact the seal and where autoclave sterilization is practiced. The silica is added to the adhesive composition in an amount of about 1% to 6% preferably 5 to 5½% by weight of the epoxy plus polyamide. The quantity of silica which is added is divided approximately into two equal parts. One half is added to the polyamide hardener and the other half is added to the epoxy material. This procedure can be varied, if desired, so as to add all or most of the silica with one of the ingredients. The viscosity of the polyamide and the epoxy resin should be approximately the same as a matter of convenience so as to facilitate mixing. The two streams contact each other and are mixed with a stirring blade in a suitable extrusion type of apparatus just prior to being extruded onto the base of the hollow metal cannula. The silica functions not only to control the thermal expansion characteristics of the adhesives but also functions to control the flow of the adhesive during the curing step. The viscosity of the adhesive material is such that it does not flow down to clog the orifice of the needle when the cannula is inserted in the bore of the hub. A sufficient amount of adhesive is extruded onto the cannula so as to achieve the desired bonding but without a large excess which would clog the orifice of the cannula. To insure against clogging an annular band of the adhesive material is extruded onto the needle a short distance from the end of the needle. The space between the cannula and the bore can, of course, vary. However, in conventional needles it is approximately .004 to .012 of an inch between the cannula and the hub. Since the bore of the constricted end portion is usually slightly tapered, the distance at the lower end of the bore will be only .002 to .006 of an inch.

After the cannula has been inserted into the bore, the hypodermic syringe is subjected to a heating at elevated temperatures so as to gel the epoxy adhesive material. Thoroughly degreased cannulas are employed to obtain adequate seals. It is not necessary to continue heating to completely cure and harden the epoxy adhesive because the subsequent heat sterilization operation may completely cure as well as post-cure the epoxy adhesive composition depending upon the hardening agent employed.

As described herein above, epoxy resins of the diglycidyl ethers of bisphenol-A types distributed under the trade name Epon Resins (Shell Chemical Co.) are preferred in practicing the invention. Polyepoxide derivatives from ortho-resol-formaldehyde novalaks reacted with epichlorohydrin distributed under the trade name Kopox (Koppers Co., Inc.); epoxidized polyolefins distributed under the trade name Oxiron (Food Machinery and Chemical Corp.); and epoxy novalaks distributed under the tradename D.E.N. (Dow Chemical Co.) are also applicable for use in this invention. Other hardening or curing agents consist of aliphatic amines, aromatic amines, polyamides, amine adducts, amides, organic acids, organic acid anhydrides and boron fluoride amine complexes such as boron trifluoride monoethylamine complex.

The following examples serve to illustrate the present invention but are not considered limiting in any way.

Example I

An adhesive material of the following composition was employed to seal a metal cannula in the bore of a glass end portion: 50 parts polyamide hardener which is the condensation product of a linoleic acid dimer and ethylene diamine (Versamid 140); 50 parts epichlorohydrin-bisphenol-A epoxy resin (Epon 828); 5½ parts of finely divided silica (Cab-O-Sil M-7); and 2 parts gamma-aminopropyltriethoxy silane. All of the ingredients were mixed shortly before extruding onto the end of a 20 gauge stainless steel cannula which was then inserted into the bore of a glass hypodermic syringe. The assembly was heated for a few minutes to gel the adhesive and immediately thereafter autoclave sterilization was carried out at 121° C. for 1 hour. The assembly was cooled and inspected. The strength of the seal remained unaffected with the seal being fully effective as indicated by subsequent tensile and hydraulic pressure tests.

Using the hypodermic syringe produced above, 15 pounds tensile load was applied to the cannula for 1 minute without any sign of bond failure. Tensile strength of this order is desirable to ensure that no separation of needle and glass barrel occurs in use such as on injection and removal of the needle. In addition the hypodermic syringe was subjected to a hydrostatic pressure test in water at 40 to 50 pounds per square inch (gauge) for 1 minute and passed successfully showing no leakage.

Example II

Following the identical procedure used in Example I, a hypodermic syringe was prepared wherein the adhesive had the following composition: 60 parts polyamide hardener of Example I; 40 parts epoxy resin of Example I; 5½ parts finely divided silica and 2 parts gamma-aminopropyltriethoxy silane. The resulting seal was satisfactory and after sterilization at 140° C. for 3 hours showed no sign of structural failure. The results were similar to those of Example I.

Example III

An adhesive composition containing 60 parts polyamide hardener of Example I; 40 parts of epoxy resin of Example I, 5 parts of finely-divided silica, and 2 parts silane (as above) was applied to a stainless steel cannula which was then inserted in the bore of a glass barrel of the type shown in FIG. 1. The assembly was then heated to set the epoxy adhesive.

Using the hypodermic syringe assembly made in Example III, a test was conducted to measure the circumferential stress on the inside surface of the barrel tip or end portion as the assemblies were heated from room temperature to 150° C.

In order to compare the characteristics of the hypodermic syringe assemblies of the present invention with conventional syringes, a conventional polyepoxypolyamide adhesive composition containing no finely divided silica was employed to bond a stainless steel cannula to the glass barrel following the same procedure as described in Example III. The conventional hypodermic syringe was subjected to the identical test procedure to measure the circumferential stress on the inside surface of the glass barrel.

Table I contains comparative data for the circumferential stress in tension developed in the glass around a Type 304 stainless steel 20 gauge needle which has been sealed in a glass syringe barrel. The values are in pounds per square inch and were measured at the temperature as indicated.

TABLE I.—STRESS VS. TEMPERATURE

| Temperature ° C. | Circumferential Stress (p.s.i.) Tension, Unsterilized Needles | |
|---|---|---|
| | Unfilled Epoxy-Polyamide Adhesive | Epoxy-Polyamide Adhesive Filled with 5% Silica |
| 25 | 720 T | 300 T |
| 45 | 1,100 T | 350 T |
| 65 | 1,400 T | 400 T |
| 85 | 1,800 T | 560 T |
| 105 | 3,100 T | 720 T |
| 125 | 4,800 T | ¹ 1,100 T |
| 145 | 5,700 T | 1,050 T |
| 150 | ¹ 6,200 T | 1,000 T |

¹ Maximum.

It is to be noted that the maximum stress developed in the hypodermic syringe of the present invention was 1100 p.s.i. which occurred at 125° C., whereas the maximum stress developed in the hypodermic syringe containing conventional adhesive was 6200 p.s.i. or almost 6 times as great. Moreover, the stress developed in the hypodermic syringe of this invention at the higher temperatures, i.e. 145-150° C., was actually less than the maximum.

The data reported above demonstrate that the addition of small amounts of finely-divided silica to the epoxy-polyamide resin adhesive significantly reduces the stress developed within the glass when subjected to high temperature sterilization. This reduction in the stress lessens the probability of cracking or failure of the seal and makes the hypodermic syringe of the present invention particularly suitable for diversified use in packaging a wide range of modern pharmaceuticals.

The adhesive compositions of the present invention are modified by the incorporation of an organo-silane as gamma-aminopropyltriethoxysilane and the like in order to provide an improved bond and permanence of the bond under moist conditions. Other silane coupling agents which may be used are chemically-modified gamma-aminopropyltriethoxysilane, 3,4-epoxycyclohexylethyltrimethoxysilane and glycidoxypropyltrimethoxysilane.

In accordance with this invention hypodermic syringe assemblies are produced which will withstand modern pharmaceutical thermal sterilization techniques and be acceptable for use under the widespread conditions that are generally encountered. They are characterized by the needle mounting having a unique leak-proof, transparent, flexible bond, as well as the necessary structural strength characteristics.

Although the foregoing discussion has placed emphasis on the use of glass barrels, it is to be understood that the adhesive described above can be used with metal, plastic or other materials which are in general use in making hypodermic needles and syringes.

In addition, it is to be understood that the finely-divided silica may be partially or completely replaced by other finely-divided materials such as carbon, aluminum oxide, silicon carbide, boron carbide as well as metals and their oxides. However, some of these materials do not provide transparent seals such as obtained by the finely-divided silica. Hydrous magnesium aluminum silicates such as bentonite-type clays are also capable of use to provide seal transparency. The preferred filler materials consist of extremely fine particles of silica such as Cab-O-Sil or silica-containing bentonite clay such as Bentones.

While we have described and illustrated a preferred embodiment of our invention, we wish it to be understood that we do not intend to be restricted solely thereto, but that we do intend to cover all modifications thereof which would be apparent to one skilled in the art and which come within the spirit and scope of our invention.

We claim:

1. A hypodermic syringe assembly component comprising a glass barrel having a constricted end portion with a narrow passage therethrough, a metallic cannula having one end disposed within said passage and communicating with the interior of said glass barrel, and a bonding material disposed between said cannula and said narrow passage sealing said cannula to said barrel end portion, said bonding material being the reaction product of a composition comprising an epoxy resin, an epoxy resin curing agent, a silane coupling agent, and a small amount of finely-divided silica-containing inert filler sufficient to produce a heat-sterilization-resistant pressure-tight bond.

2. A hypodermic syringe assembly component comprising a glass barrel having a constricted bore at one end portion, a metallic cannula having one end disposed within said bore and communicating with the interior of said glass barrel, and an annular layer of bonding material disposed between the juxtaposed portions of said cannula and said bore sealing the same into an integral structure, said bonding material being the reaction product of a composition comprising about 40 to 90 parts by weight of an epoxy resin, about 60 to 10 parts by weight of a polyamide curing agent, about 1 to 3 parts by weight of a silane coupling agent, and about 1 to 6 parts by weight of a finely-divided silica-containing inert filler sufficient to produce a heat-sterilization-resistant pressure-tight bond.

3. A hypodermic syringe assembly component as defined in claim 2, wherein said inert filler comprises silica ranging in amount from about 5 to 5.5 parts by weight.

4. A hypodermic syringe assembly component as defined in claim 2, wherein said epoxy resin is present in the amount of about 50 parts by weight, said polyamide curing agent is present in the amount of about 50 parts by weight, said silica coupling agent is present in the amount of about 2 parts by weight, and the inert filler comprises silica present in the amount of about 5.5 parts by weight.

5. A hypodermic syringe assembly component resistant to heat-sterilization comprising a hollow tubular glass barrel having a narrow constricted bore at one end portion, a stainless steel cannula having one end disposed within said bore and communicating with the interior of said glass barrel, and an annular layer of sealing material bonding said cannula within said bore, said sealing material being the reaction product of a composition comprising an epoxy resin containing more than one reactive group of the structure

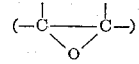

per molecule, a polyamide curing agent which is the reaction product of a polyamine and a vegetable oil, an organo-silane coupling agent in minor amount, and submicroscopic particles of silica in minor amount not exceeding about 6 percent by weight of the epoxy resin plus polyamide curing agent.

6. A hypodermic syringe assembly component in accordance with claim 5, wherein said composition comprises about 40 to 90 parts by weight of said epoxy resin, about 60 to 10 parts by weight of said polyamide curing agent, about 1 to 3 parts by weight of said organo-silane coupling agent, and about 1 to 6 parts by weight of finely-divided silica in submicroscopic particulate form.

7. A hypodermic syringe assembly component in accordance with claim 5, wherein said epoxy resin comprises an epichlorohydrin-bisphenol epoxy resin.

8. A hypodermic syringe assembly component in accordance with claim 5, wherein said composition comprises about 50 parts by weight epichlorohydrin-bisphenol epoxy resin, about 50 parts by weight polyamide curing agent, about 2 parts by weight organo-silane coupling agent, and about 5.5 parts by weight silica.

9. In a method for making a heat sterilizable hypodermic syringe assembly comprising a glass barrel and an integral metallic cannula, wherein the said metallic cannula is bonded into a constricted narrow passage at the delivery end of the glass barrel with an adhesive, said metallic cannula and said glass barrel having substantially different thermal coefficients of expansion which tends to cause a failure in the bond when said hypodermic syringe is subjected to heat sterilization, the improvement whereby the bond between the metallic cannula and the glass barrel is permanently maintained and is capable of withstanding heat sterilization operations and which comprises employing as the adhesive a mixture of an epoxy resin and a polyamide curing agent and a sufficient amount of finely divided silica to provide an effective transparent bond between the cannula and the glass barrel.

10. In a method for making a heat sterilizable hypodermic syringe assembly comprising a glass barrel and an integral metallic cannula, said metallic cannula being bonded in a constricted narrow passage at the delivery end of said glass barrel by an epoxy adhesive composition containing a polyamide curing agent and where substantial differences in the thermal coefficients of expansion of the metallic cannula and the glass barrel tend to cause separation of the bond between the said cannula and glass barrel upon heat sterilization operations, the improvement whereby the bond between the metallic cannula and the glass barrel is effectively maintained without failure and which comprises adding to the adhesive material a finely divided silica in a sufficient amount to provide a transparent seal between the cannula and the barrel that is capable of withstanding high sterilization temperatures.

11. In a method of making a sterilizable hypodermic syringe assembly comprising a glass barrel and an integral metallic cannula, the base of the said metallic cannula being sealed into the constricted narrow passage at the delivery end of the glass barrel by means of an epoxy-polyamide adhesive composition, said glass barrel and metallic cannula having thermal coefficients of expansion which are substantially different and which differences tend to cause separation of the seal between said cannula and said glass barrel, the improvement whereby the seal between the metallic cannula and said glass barrel is effectively maintained throughout heat sterilization operations and which comprises adding a finely divided silica to the polyamide hardener and an approximately equal portion of finely divided silica to the epoxy resin, mixing the silica-containing polyamide with the silica-containing epoxy resin to obtain a homogeneous composition and thereafter coating the said base of the said metallic cannula immediately prior to the insertion of the said metallic cannula into the glass barrel and heating to obtain a seal capable of withstanding high temperature sterilization operations.

12. In a method for making a heat sterilizable hypodermic syringe assembly comprising a glass barrel and metallic cannula, said glass barrel having a constricted end portion with a narrow passage therethrough adapted for receiving the base end of the said metallic cannula, said cannula being sealed in said glass barrel with an epoxy-polyamide adhesive composition, the steps comprising adding a finely divided silica filler to the adhesive composition, a portion of the silica filler being added to the polyamide curing agent, the remaining portion being added to the epoxy resin, mixing the two portions together immediately prior to application to the area of the said cannula adjacent the base inserting said cannula into the constricted passage of said glass barrel and heating to react the reactive components of the said adhesive composition to form a bond capable of withstanding high temperature sterilization operations.

References Cited

UNITED STATES PATENTS

| | | | |
|---|---|---|---|
| 2,989,053 | 6/1961 | Hamilton | 128—221 |
| 3,102,823 | 9/1963 | Manasia et al. | 260—37 |
| 3,179,623 | 4/1965 | Bowen | 260—37 |

OTHER REFERENCES

"Bakelite C-8 Epoxy Resins & Hardeners"; p. 13, © 1954 by Union Carbide Carbon Corporation. Copy in 128-221.

RICHARD A. GAUDET, *Primary Examiner.*

R. E. MORGAN, *Examiner.*

D. L. BAKER, *Assistant Examiner.*